(12) United States Patent
Wolff et al.

(10) Patent No.: US 8,979,165 B2
(45) Date of Patent: Mar. 17, 2015

(54) MOTOR VEHICLE BODY

(71) Applicant: GM Global Technology Operations LLC, Detroit, MI (US)

(72) Inventors: Stefan Wolff, Hochheim (DE); Uwe Schmitz, Nauheim (DE); Joachim Schaefer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/648,395

(22) Filed: Oct. 10, 2012

(65) Prior Publication Data

US 2013/0088043 A1    Apr. 11, 2013

(30) Foreign Application Priority Data

Oct. 11, 2011    (DE) .......................... 10 2011 115 588

(51) Int. Cl.
| | |
|---|---|
| *B60J 1/02* | (2006.01) |
| *B62D 27/04* | (2006.01) |
| *B60R 21/34* | (2011.01) |
| *B60J 1/00* | (2006.01) |

(52) U.S. Cl.
CPC ................ *B60R 21/34* (2013.01); *B60J 1/006* (2013.01); *B60R 2021/343* (2013.01)
USPC .................... 296/96.21; 296/192; 296/187.04

(58) Field of Classification Search
USPC .......................... 296/84.1, 96.21, 192, 187.04
See application file for complete search history.

(56) References Cited

U.S. PATENT DOCUMENTS

| | | | | |
|---|---|---|---|---|
| 4,717,198 | A | * | 1/1988 | Komatsu ....................... 296/192 |
| 5,052,742 | A | * | 10/1991 | Akoshima et al. ............ 296/192 |
| 6,193,304 | B1 | | 2/2001 | Takahashi et al. |
| 6,340,200 | B1 | | 1/2002 | Enomoto et al. |
| 2008/0284208 | A1 | * | 11/2008 | Kannan et al. ................ 296/192 |
| 2010/0320856 | A1 | | 12/2010 | Lauke et al. |
| 2011/0304177 | A1 | | 12/2011 | Walter et al. |

FOREIGN PATENT DOCUMENTS

| | | |
|---|---|---|
| DE | 102006029921 A1 | 1/2008 |
| DE | 102010005834 A1 | 7/2011 |
| EP | 1736398 A2 | 12/2006 |
| EP | 2105375 A1 | 9/2009 |
| JP | 2004155351 A | 6/2004 |

OTHER PUBLICATIONS

German Patent Office, German Search Report dated May 24, 2012 for German Application No. 10 2011 115 588.4.

* cited by examiner

*Primary Examiner* — Jason S Morrow
(74) *Attorney, Agent, or Firm* — Ingrassia Fisher & Lorenz, P.C.

(57) ABSTRACT

A motor vehicle having a windshield, A-pillars laterally enclosing the windshield and a window cross member connected to the A-pillars is provided. The window cross member supports a lower edge of the windshield in that it comprises a support section touching the windshield. The window cross member includes a point of action fastened to the A-pillar, which is offset in the direction of a surface normal of the windshield against the support section. The window cross member also includes a compressible section that connects the point of action with the support section.

7 Claims, 2 Drawing Sheets

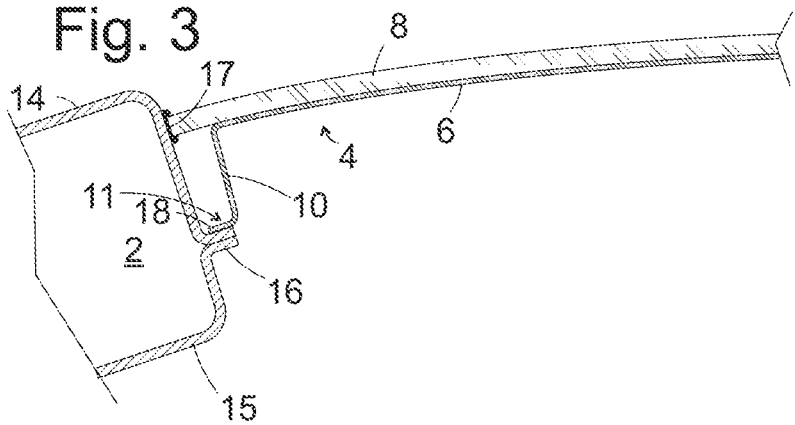
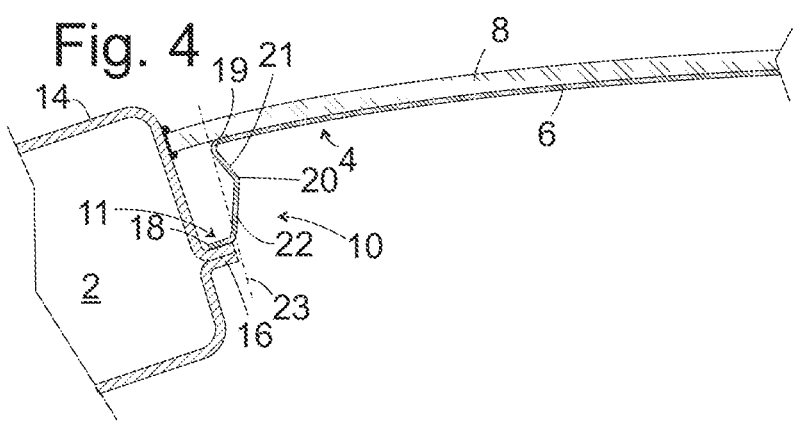
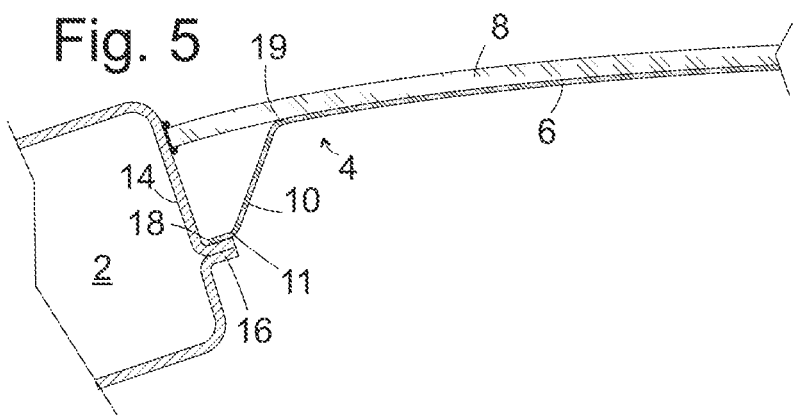

MOTOR VEHICLE BODY

CROSS-REFERENCE TO RELATED APPLICATION

This application claims priority to German Patent Application No. 10 2011 115 588.4, filed Oct. 11, 2011, which is incorporated herein by reference in its entirety.

TECHNICAL FIELD

This application pertains to a motor vehicle body with a front hood, and a window cross member supporting a front lower edge of the windshield.

BACKGROUND

Such a motor vehicle is known from DE 10 2009 029 921 A1. With this conventional motor vehicle, the window cross member comprises a support leg whose front edge is formed by a support section touching the windshield and which, during an accident, for example, the head of a pedestrian striking the lower edge of the windshield can yield in order to reduce the risk of serious head injuries.

When the head strikes a middle region of the support section, the support section can yield approximately uniformly on both sides of the head and the stiffness of the window cross member can be set so that the legal requirements regarding the HIC (Head Injury Criterion) are adhered to.

However, it is being shown in practice that during a head impact in the vicinity of the A-pillars laterally enclosing the windshield deviating HIC-values are obtained. The reason for this is the connection of the window cross member to the A-pillars, which renders a yielding of the support section in the vicinity of the A-pillars difficult.

Thus, it may be desirable to create a motor vehicle wherein the fluctuation of the HIC-values along the window cross member is reduced. In addition, other objects, desirable features and characteristics will become apparent from the subsequent summary and detailed description, and the appended claims, taken in conjunction with the accompanying drawings and this background.

SUMMARY

According to various exemplary embodiments, provided is a motor vehicle having a windshield, the A-pillars laterally enclosing the windshield and a window cross member supporting a lower edge of the windshield, connected to the A-pillars and touching the windshield having a support section, in which an engagement point of the window cross member fastened to the A-pillar is offset in the direction of a surface normal of the windshield against the support section and the window cross member comprises a compressible section which connects the support section to the point of action. By way of shaping and material thickness of the compressible section, the resilience of the support section can be adjusted also in the immediate vicinity of the A-pillar substantially uninfluenced by the latter.

In one exemplary embodiment, the window cross member is unitarily formed from a flat material, for example, a sheet metal.

In one example, according to various exemplary embodiments, the compressible section can comprise a strip of flat material, which is angled off at an end of the window cross member facing one of the A-pillars. Generally, the strip is angled off immediately from the support section of the window cross member.

In order to be effectively compressed during an impact, the strip is generally oriented substantially in the direction of the surface normal of the windshield.

In order to be able to reproducibly adjust the force at which the strip would yield, it is practical if the strip is not exactly oriented in the direction of the surface normal, but at least comprises a section that is near the window and near the engagement point, which are separated from each other through a buckling section or bending section.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 3 is a schematic cross section through a part of an A-pillar and the windshield adjoining thereto according to one exemplary embodiment of the present disclosure;

FIG. 4 is a cross section analogous to FIG. 3 according to another exemplary embodiment; and FIG. 5 is a cross section analogous to FIG. 3 according to another exemplary embodiment.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
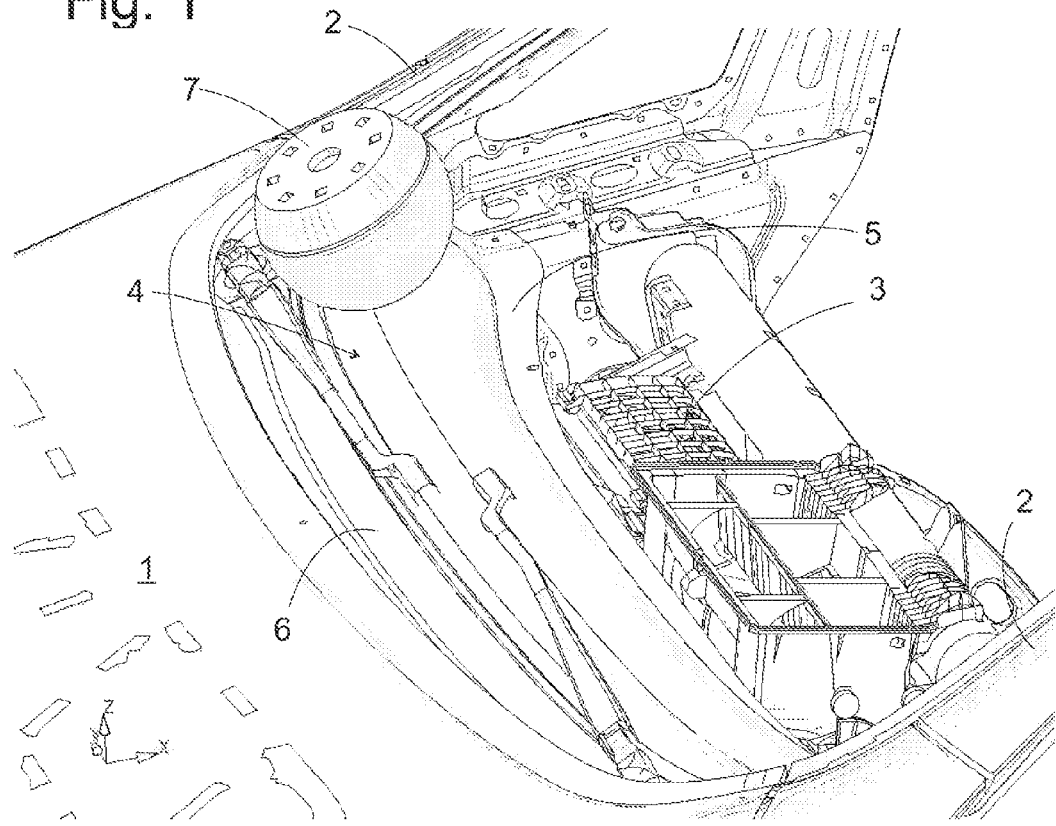
FIG. 1 is a perspective view of a part of a motor vehicle body according to various teachings of the present disclosure and of an exemplary impactor simulating the impact of the head of a pedestrian.

FIG. 1 shows a perspective view of a part of a motor vehicle body, to which the various teachings of the present disclosure can be applied. Visible is the rear region of a front hood 1 and a window opening following said region which with the finish-assembled vehicle receives a windshield, flanked by A-pillars 2. An instrument panel covering is omitted in FIG. 1 in order to be able to show installations 3 of the instrument panel located below and a window cross member 4 formed from a single-layer sheet metal cutting, which in the finished vehicle are concealed under the instrument panel covering. A rear edge 5 of the cross member supports itself on the upper edge of a separating wall, which, not visible in FIG. 1, extends between passenger cell and engine compartment. A front edge of the window cross member 4 forms a support section 6, which supports a front lower edge of the windshield in direct contact.

An impactor 7 shown above the window cross member 4 shows the position in which, when the vehicle collides with an adult pedestrian of normal size and said pedestrian strikes the front hood 1, the head of said pedestrian strikes the bodywork. The impact point is located in a lower region of the windshield above the window cross member 4 and the impact direction approximately corresponds to the surface normal of the windshield at this point.

Figure 2:
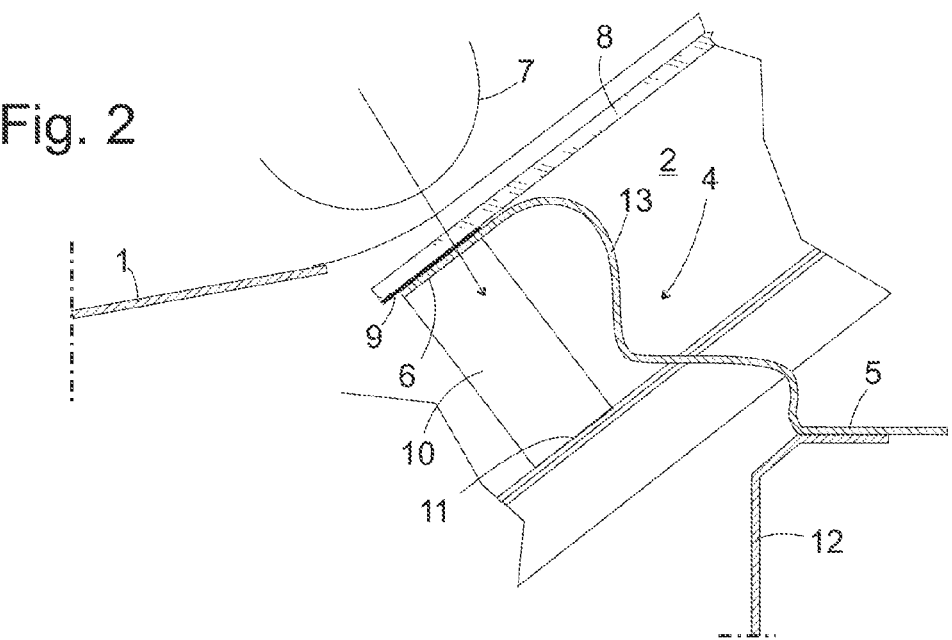
FIG. 2 is a schematic cross section through the window cross member and its surroundings immediately before an impact.

FIG. 2 shows the impact situation by means of a schematic cross section of the window cross member 4 and its surroundings in the finish-assembled vehicle. In this cross section, the windshield 8 is also shown whose lower edge is fastened to the support section 6 of the window cross member 4 via an adhesive layer 9. The support section 6 extends almost over the entire width of the windshield 8 in close contact with the latter; it merely ends shortly before reaching the A-pillars 2 and merges into compressible sections 10 angled off into the vehicle interior at its ends facing the A-pillars 2. Distal ends 11 of the compressible sections 10 are anchored to the A-pillars 2 spaced from the windshield 8.

The support section 6 forms a front edge of the window cross member 4 unitarily cut to size and formed from sheet metal; the rear edge 5 is located at a lower level than the support section 6 and is fastened to the upper edge of an intermediate wall 12, which separates engine compartment and passenger cell. A central region 13 of the window cross member 4, which connects the support section 6 and the rear edge 5 comprises a zig-zag or wavy cross section, which can yield in the case of a head impact, in that it is compressed and the support section 6 moves towards the upper edge of the intermediate wall 12. When such an impact occurs in a region of the windshield 8 that is far distant from both A-pillars 2, the deflection of the support section 6 immediately at the impact point of the head or impactor 7 is greatest and from there gradually decreases towards both sides. The kinetic energy of the impactor 7 is therefore consumed by the central region 13 through deformation directly at the impact point and on both sides of said region.

If the window cross member 4 were only supported on the intermediate wall 12 and not connected to the A-pillars, only a central region 13 deformable on one side of the impact point would be available in the case of an impact on the windshield 8 in the vicinity of one of the A-pillars 2. As a consequence, the resilience of the window 8 near the A-pillars 2 would be substantially higher than in a central region of the windshield 8 between the A-pillars 2, and there would be the risk of a striking-through of the impactor 7 as far as into regions of the body that can be deformed only to a minor degree, such as for example the intermediate wall 12. Sliding-off of the impactor 7 in lateral direction and striking against the A-pillar 2 would also be possible. In both cases, no satisfactory pedestrian protection is possible. However, if the ends of the support section 10 were directly fastened to the A-pillars 2, these ends could yield only together with the A-pillars 2 in the event of an impact in their vicinity. However, these must not yield too easily so that they can firmly support the roof of the vehicle so that the vehicle occupants are effectively protected also during a roll-over. In this case, the resilience of the window 8 in the vicinity of the A-pillars 2 is less than between them. The compressible section 10 by contrast allows substantially determining arbitrarily the resilience of the support section 6 even in the immediate vicinity of the A-pillars 2. For this reason it is possible through a suitable choice of parameters such as wall thickness, length and cross section of the compressible section 10 to adjust a resilience of the window 8 that substantially stays the same over the entire width of the windshield 8.

FIG. 3 shows a first exemplary embodiment of the compressible section 10 in a schematic cross section in a plane that is perpendicular to the longitudinal direction of the A-pillar 2 (shown only partially). The A-pillar 2 is a hollow profile joined together from a plurality of panels, in this case an outer panel 14 and an inner panel 15. Edges of the panels 14, welded together form a web 16, which stands away from a flank of the A-pillar 2 facing the edge 17 of the windshield 8. The edge 17 extends parallel to the web 16 spaced from the latter. The spacing is bridged by the compressible section 10 substantially extending in the direction of the surface normal of the windshield 8. On the distal end of the compressible section 10 facing away from the support section 6 a tongue 18 is angled off in an orientation that is substantially parallel to the support section 6 in order to act on the web 16. The tongue 18 can be fastened to the web 16 for example through spot welding, but a simple positive connection of the window cross member 4 between the windshield 8 and the A-pillars 2 can also suffice in order to retain the tongues 18 on the webs 16 on both ends of the window cross member 4. In the exemplary embodiments, the tongues 18 serves as engagement points (not separately numbered) of the window cross member 4 to engage the A-pillars 2.

FIG. 4 shows a section that is analogous to FIG. 3 according to a second configuration. The orientation of the compressible section 10 substantially in the direction of the surface normal of the windshield 8 designated 23 here is the same as in the case of FIG. 3, however the compressible section 10 in this case is divided through a buckling zone 20 into a section 21 adjacent to the windshield 8 and a section 22 adjacent to the web 16, the orientation of which individually deviates from the surface normal 23 in each case. In the case considered here, the deviation is such that the buckling zone 20 is offset towards the vehicle center against the surface normal 23 running through proximal and distal end 19 and 11 respectively of the compressible section 10. The presence of the buckling zone 20 ensures that the compressible section 10 starts to yield with an accurately and reproducibly adjusted load. Through the offset of the buckling zone 20 towards the vehicle center it is ensured that the compressible section 10, when it is compressed under the load of an impact, yields towards the vehicle center and the compression of the section 10 can thus not be obstructed through a striking against the A-pillars 2. In that the section 21 close to the window is made slightly narrower than the section 22 close to the web it can be ensured that forces parallel to the surface of the web 16, which during a compression act on the tongue 18, are directed away from the vehicle center. Thus, sliding-away of the tongue 18 from the web 16 is securely avoided even when both are not immovable fastened to each other.

With the exemplary configuration of FIG. 5, the orientation of the compressible section 10 significantly deviates from the surface normal. The proximal end 19 is clearly offset towards the vehicle center relative to the distal end 11. This compressible section 10 is initially subjected to thrust in the event of an impact. It exerts a strong supporting force at the latest when the tip of the tongue 18 at the foot of the web 18 strikes against the outer panel 14. At the same time, bending moments in opposite direction occur at the proximal end 19 and in a middle region of the support section 10, which after overcoming an initial resistance result in that the support section 10 buckles towards the vehicle center in a similar manner as the one shown in FIG. 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle, comprising:
a windshield having a lower edge;
A-pillars laterally enclosing the windshield, at least one of said A-pillars including a web extending therefrom;
a window cross member supporting the lower edge of the windshield, connected to the A-pillars and having a support section touching the windshield,
wherein the window cross member includes an engagement point engaging the web of the at least one of the A-pillars, the engagement point being offset in the direction of a surface normal of the windshield against the support section,
wherein the window cross member includes a compressible section which connects the engagement point with the support section, and
wherein the compressible section further comprises a strip of flat material angled-off at an end of the window cross member.

2. The motor vehicle according to claim 1, wherein the window cross member is unitarily formed from a flat material.

3. The motor vehicle according to claim 1, wherein the flat material is sheet metal.

4. The motor vehicle according to claim 1, wherein the compressible section is angled off the support section.

5. The motor vehicle according to claim 1, wherein the compressible section is substantially oriented in the direction of the surface normal.

6. The motor vehicle according to claim 1, wherein the compressible section comprises at least one section close to the window and a section close to the engagement point which are separated from each other by a buckling or bending section.

7. The motor vehicle according to claim 6, wherein the buckling or bending section is offset toward a center of the vehicle.

* * * * *